United States Patent Office 3,495,340
Patented Feb. 17, 1970

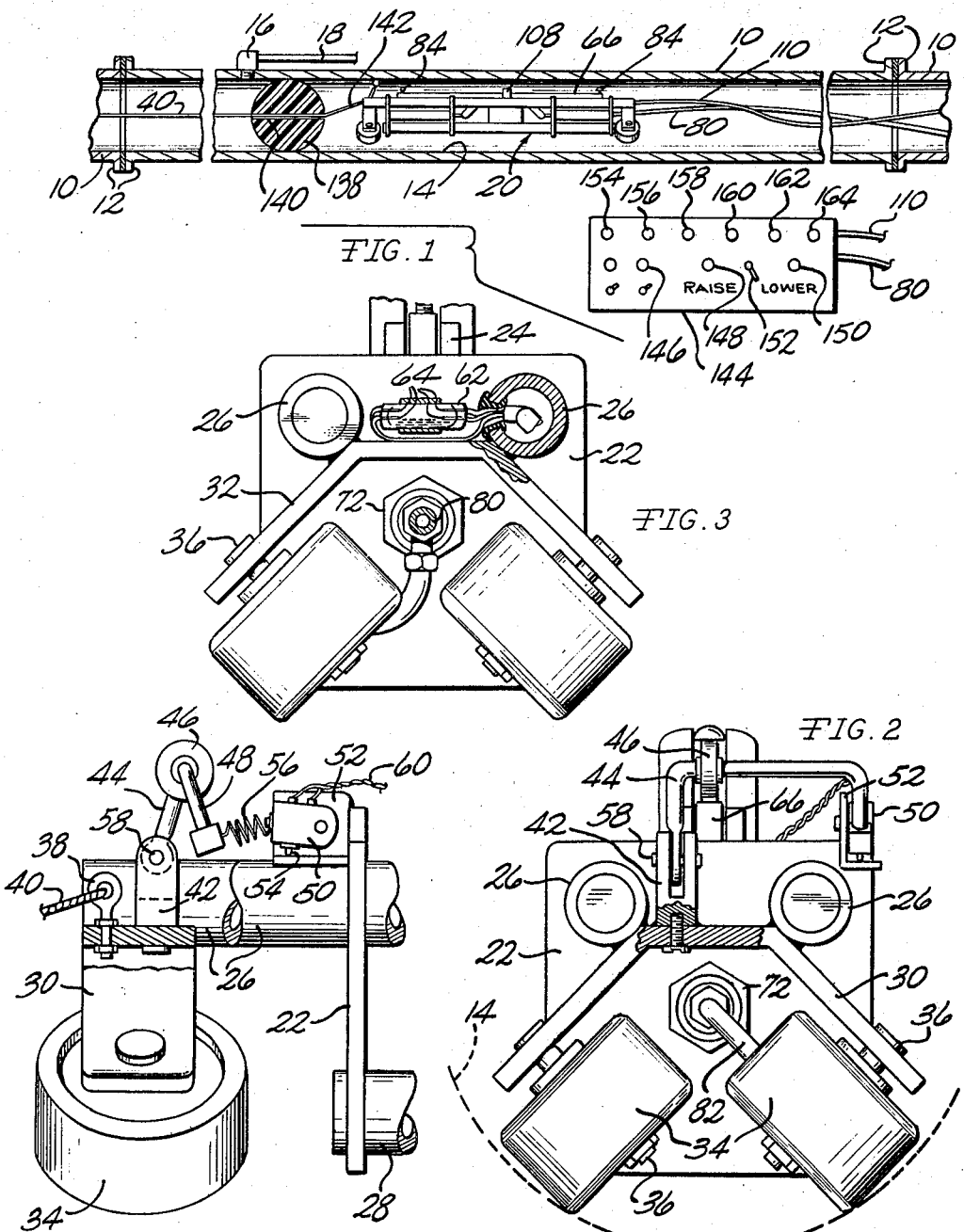

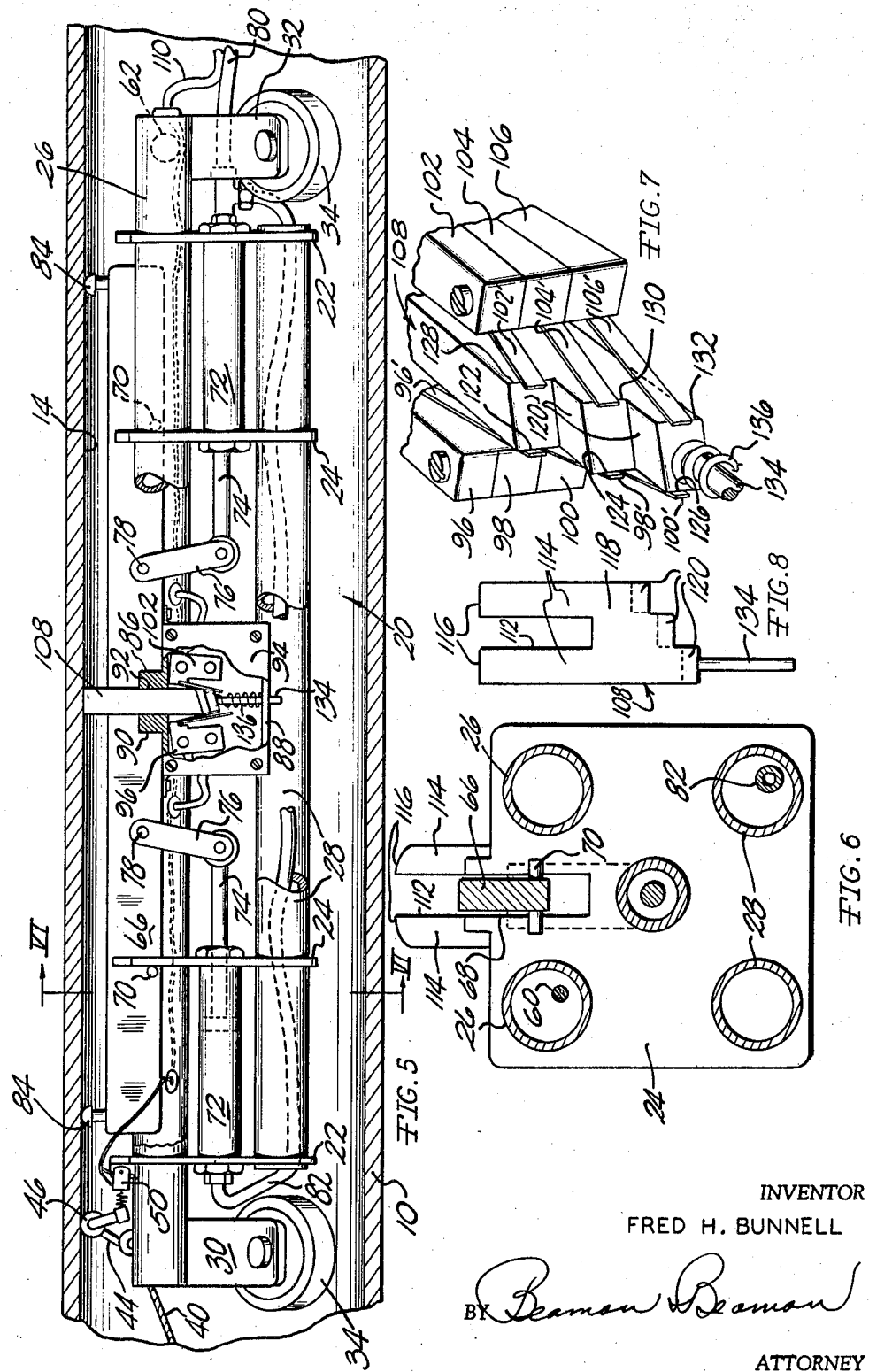

3,495,340
CONDUIT STRESS MEASURING SYSTEM
Fred H. Bunnell, 719 Woodfield Drive,
Jackson, Mich. 49203
Filed Mar. 20, 1967, Ser. No. 624,491
Int. Cl. G01b 5/12
U.S. Cl. 33—174                                      10 Claims

ABSTRACT OF THE DISCLOSURE

A system for measuring the stress imposed upon buried pipelines and conduits comprising method and apparatus for internally sensing bending stresses imposed upon a buried conduit by measuring lateral deflection wherein measuring apparatus is longitudinally moved through the conduit and measurements of deflection within the conduit due to bending stress are periodically taken and indicated at a remote location.

BACKGROUND OF THE INVENTION

The field of the invention lies in measuring and testing methods and apparatus wherein the bending stress imposed upon a conduit is sensed by measuring apparatus located within the conduit, and the measuring apparatus is longitudinally positionable within the conduit being measured.

To the inventor's knowledge, there presently is no apparatus available for determining the bending stress existing within buried conduits or pipelines, wherein the measurements are taken from within the conduit. In the present practice, when it is desired to determine the presence of bending stress imposed upon buried conduits, holes are dug in the ground to expose the top of the conduit at longitudinally spaced locations. Thereupon, stadia rods are placed upon the exposed portions of the conduit and a reading taken by a level. The readings at various axial locations taken from the top of the conduit are compared, and the differences in the readings would indicate the location and degree of deflection of the conduit due to vertical forces producing bending stress thereon. This manner of testing buried conduit, of course, is very expensive, troublesome and slow.

SUMMARY OF THE INVENTION

Buried pipeline and conduit systems which are now being installed for the purpose of distributing utilities, natural gas, for instance, usually employ steel pipe sections interconnected at their ends either by welding or a mechanical connection. In years past, it was common to use cast iron pipe in buried pipelines, and, presently, many hundreds of miles of cast iron pipeline are being used in the distribution of natural gas or other media for both domestic and industrial purposes. Cast iron pipe is much more suspectible to breakage than steel pipe, due to the relatively rigid and brittle characteristics of cast iron. The low yield point of cast iron makes cast iron pipelines particularly susceptible to fracture due to bending stresses occurring within the conduits.

When installing cast iron pipe, it was common to support the pipe at its ends upon a block and the fill dirt was then thrown upon the conduits while supported at the joints. Over the course of many years of use, the vertical forces imposed upon the pipe due to the weight of the earth above, frost or freezing conditions, or the presence of a driveway, roadway or other man-made or natural condition will produce sufficient compression of the earth above the pipe to cause the pipe to "sag" or bend intermediate its ends. Such bending is particularly noticeable where the earth below the pipe has settled or otherwise been disturbed.

The occurrence of excessive bending stress within cast iron buried pipelines transporting natural gas creates a very hazardous condition as fracture of the pipeline will permit combustible gas to escape in considerable quantities producing a potentially explosive condition.

Presently, utility companies using cast iron pipelines do so with reluctance, but necessity. The cost of replacing cast iron pipelines with steel conduits is prohibitive, and it has been the practice of utility companies to replace only that cast iron pipe which fractures and breaks, or replace sections of cast iron pipe and conduit which are located in areas particularly susceptible to heavy traffic, or other conditions which may impose heavy bending stresses upon the buried conduit.

The invention pertains to a method and apparatus which permits buried pipelines to be measured and tested in situ wherein the degree of bending stress imposed upon the buried conduit can be accurately determined and potentially dangerous conditions discovered prior to fracturing occurring. In the practice of the invention, measuring apparatus is introduced into the pipeline and is pulled through the pipeline for measuring the pipeline at any desired location. The measuring apparatus is located where desired, usually intermediate the ends of a conduit, and while the apparatus is stationary, measuring means are placed against the inner surface of the conduit, preferably the upper, inner surface. The measuring means includes a plurality of conduit inner surface contacting points which are longitudinally spaced relative to each other. One of the conduit inner surface-engaging points is movable with respect to the other points whereby a predetermined relationship of the measuring points can be made and, thus, any deviation of the conduit inner surface from a predetermined relationship of the measuring points can be determined.

In the preferred embodiment, the measuring apparatus consists of a frame adapted to be pulled through the conduit. The frame includes a measuring bar which is radially movable with respect to the axis of the conduit wherein the measuring bar may be moved toward the conduit inner surface while the frame is stationary within the conduit. The conduit-engaging points mentioned above are formed upon the measuring bar, and sensing means are employed in conjunction with a radially movable point mounted upon the bar which energizes remotely located indicating means to indicate to the operator the degree of bending stress within the conduit being analyzed.

As the primary bending stress imposed upon a buried conduit occurs from weight vertically imposed upon the conduit, it is necessary that the measurements taken within the conduit occur in substantially the vertical plane. Thus, it is of importance that the measuring apparatus be oriented to the vertical while a measurement is being taken. To this end the apparatus includes means for translating the frame through the pipeline which tends to maintain the frame in a substantially vertical position, and sensing means are mounted upon the frame to indicate to the operator if the frame deviates from a vertical relationship a predetermined degree.

Buried pipelines usually include lateral connections from which the medium within the pipeline is supplied. In a natural gas system a T is threaded into the conduit wall and often extends a slight distance into the conduit interior. As the presence of such obstructions extending radially inward of the conduit inner wall could adversely affect a stress-measuring reading, the apparatus of the invention utilizes means for sensing the presence of such an obstruction wherein the operator is advised of the presence of the same and will take care to prevent such an obstruction from affecting the measurement.

It is, therefore, an object of the invention to provide a method for determining the physical bending stress imposed upon a buried pipeline wherein a determination may be made as to the potential danger of a conduit within the pipeline fracturing or breaking.

A further object of the invention is to provide a method for measuring the degree of bending stress imposed upon a buried pipeline or conduit wherein the measurement occurs while the pipeline is in situ and disturbing of the pipeline system during the testing operation is minimized.

An additional object of the invention is to provide measuring apparatus capable of being inserted and translated within a buried pipeline such that measurements may periodically be taken along the pipeline to indicate deflection of the pipeline conduits from a predetermined relationship whereby bending stresses may be sensed and indicated.

BRIEF DESCRIPTION OF THE DRAWINGS

The objects of the invention will be apparent from a description of the method and apparatus described in the following specification and illustrated in the accompany drawings wherein:

FIG. 1 is a diametrical, elevational view of a pipeline being measured for the existence of bending stresses in accord with the practice of the invention, FIG. 2 is a front, elevational view of the measuring apparatus in accord with the invention, a portion thereof being broken away for purpose of illustration, FIG. 3 is a rear, elevational view of the measuring apparatus of the invention, a portion of the mercury switch structure being broken away, FIG. 4 is an enlarged, elevational, detail, side view of the front of the measuring apparatus in accord with the invention, FIG. 5 is an enlarged, side, elevational view of the measuring apparatus, a portion of the switch box and one of the upper frame members being broken away for purpose of illustration, FIG. 6 is an elevational, sectional view taken along Section VI—VI of FIG. 5, FIG. 7 is an enlarged, detail, perspective view of the switch actuator and switches employed to sense conduit deflection, and FIG. 8 is a front, elevational view of the switch actuator, per se.

DESCRIPTION OF THE PREFERRED EMBODIMENT

In FIGS. 1 and 5 a typical pipeline installation is illustrated. The buried pipeline with which the method and apparatus of the invention will be employed usually consists of a plurality of conduits 10 interconnected at their ends by bolted flanges 12, or the like. As mentioned above, the invention is particularly useful in testing cast iron pipeline installations, and such pipelines as are to be tested will usually have an internal diameter no less than four inches.

The conduits 10 of the pipeline include an inner cylindrical surface 14, and T members 16 are periodically threaded through the wall of the conduits and the threaded stem thereof may project a small distance inwardly of the inner surface of the conduits. Smaller service pipes 18 communicate with the T members 16 whereby gas may be supplied to the service pipes from the pipeline.

The measuring apparatus is placed directly within that section of the pipeline to be measured. Insertion of the measuring apparatus into the pipeline can be accomplished by cutting a hole in the pipeline or removing a section of pipeline of approximately a three foot length. In the illustrated embodiment, the measuring apparatus is of the type which is pulled through the pipeline, rather than being of a self-propelled type and, thus, two access openings are formed in the pipeline, as will be later described.

The measuring apparatus consists of an elongated frame 20 which basically consists of four tubular members arranged in a square relationship, FIG. 6, which are maintained in this relationship by four longitudinally spaced, parallel plates having holes defined therein for closely receiving the tubes. The plates 22 located at the front and rear of the frame 20 are of a configuration which will be appreciated from FIGS. 2 and 3. The inner plates 24 have a configuration which will be appreciated from FIG. 6. As will be noted from FIG. 5, the length of the upper tubes 26 is greater than that of the lower tubes 28.

Inverted V-shaped brackets 30 and 32 are affixed to the underside of the upper tubes 26 at the front and rear, respectively, as will be appreciated from FIGS. 2 and 3. A pair of wheels 34 are rotatably mounted upon axles 36 affixed in each of the brackets 30 and 32, and the angle of the wheel-supporting portions of the bracket is such that the axes of associated wheels are disposed substantially 90° with respect to each other. As will be apparent from FIG. 2, wherein the inner surface 14 of the conduit is represented in dotted lines, the wheels 34 engage the conduit inner surface at locations above the bottom or lowermost portion of the conduit inner surface. As seen in FIG. 4, an anchor eye 38 is affixed to the bracket 30 whereby a pull cord 40 may be affixed thereto. It is to be noted that the location at which the pull cord is attached to the anchor eye 38 is substantially vertically disposed above the longitudinal axis of the conduit in which the measuring apparatus is located, FIG. 1.

A pivot support 42 is affixed to the bracket 30 adjacent the front end of the frame, and pivotally supports a lever 44 which extends upwardly and horizontally. A "feeler" wheel 46 is rotatably mounted upon the horizontal portion of the switch lever 44. The switch lever 44 terminates in a downwardly disposed portion 48 located adjacent a pivotally moutned "micro" switch 50. The micro switch 50 is pivotally mounted upon the adjacent plate 22 by means of a bracket 52 and is rotatable in a vertical plane. The switch includes an actuating button 54 which may selectively engage the horizontal portion, FIG. 2, of the switch bracket 52. The switch 50 is interconnected to the switch actuating lever 44 by a spring 56, wherein rotation of the lever 44 in a rear or clockwise direction about its pivot pin 58, FIG. 4, causes the switch 50 to pivot counterclockwise and actuate the contact button 54. The spring 56 permits a lost motion connection between the switch lever and the switch whereby "overtravel" of the switch lever 44 is permitted. Electrical conductors 60 are connected to the switch and pass into a tube 26, as will be appreciated from FIGS. 5 and 6.

At the rear of the frame 20 a mercury switch 62 is mounted which consists of an elongated glass envelope horizontally disposed and transeversely related to the axis of the frame and, hence, transversely related to the axis of the pipeline conduit in which the frame is located. The switch 62 includes a pair of electrodes 64 at each end of the switch, and the electrodes are so located that tilting or rotation of the frame about its longitudinal axis a predetermined amount will cause the electrodes at the "low" end of the switch to be bridged by the mercury and, thus, close a circuit to the indication and control means, as will be later described.

Sensing of the conduit to be measured to determine and evaluate the presence of bending stress is accomplished by a measuring or gauge bar 66 which is radially movably supported upon the frame 20. The gauge bar 66 may be of the rectangular configuration disclosed, having a length slightly less than the length of the measuring apparatus. The inner plates 24 are each provided with a vertically disposed slot 68 in which the measuring bar is slidably received, FIG. 6. A pair of transversely disposed pins 70 are mounted in the measuring bar adjacent the outer surface of each of the plates 24 wherein engagement of the pins with the plates 24 prevents longitudinal displacement of the measuring bar with respect to the frame. The pins 70, in conjunction with the slots 68, will permit the measuring bar to move only in a radial direction, as will be appreciated.

Radial movement of the measuring bar 66 is accomplished by a pair of small, expansible chamber motors 72 of the piston and cylinder type. The motors 72 are each supported upon a plate 22 and an inner plate 24, FIG. 5. The pistons 74 of the motors being disposed toward each other in opposed relation. A double bar linkage connection 76 is associated with each of the motor pistons 74 whereby the linkages 76 are connected to the measuring bar 66 by pivot pins 78. The motors 72 are of the spring return type and are pressurized by compressed air being supplied through a supply line 80 and branch line 82 received within one of the lower tubes 28.

Energizing or pressurizing of the motors 72 causes the pistons 74 to expand to the position shown in FIG. 5. This operation pivots the associated linkages 76 such as to radially translate the gauge bar 66 in the vertical direction, which is also radial with respect to the axis of the conduit. When the expansible motors are de-energized, the springs within the motors will retract the pistons, producing a downward pull upon the linkages 76 which lowers the gauge bar to the relationship shown in FIG. 1.

The gauge bar 66 is provided with conduit inner surface-engaging projections or points 84 which extend upwardly. The projections 84 may be threadedly adjustably mounted upon the gauge bar as to be positionable as desired with respect to the gauge bar. It will be noted that the projections 84 are located at opposite ends of the gauge bar as to provide a maximum separation therebetween in the longitudinal direction of the measuring apparatus.

The central underside portion of the gauge bar is recessed at 86, FIG. 5, and a switch box 88 is affixed to the underside of the gauge bar by bolts. The switch box 88 includes an upwardly extending, heavy walled portion 90 received within the recess 86 in which guide surfaces 92 for the switch actuator are formed. The interior of the switch is adapted to be enclosed by a cover plate 94 removably affixed thereto by screws.

In the disclosed embodiment, six micro switches 96, 98, 100, 102, 104 and 106 are mounted within the switch box 88. Each of the micro switches includes an operating lever having a primed reference numeral corresponding to the associated switch which extends downwardly for engagement by the switch actautor 108. Three micro switches 96, 94 and 100 are mounted in side-by-side relationship in front of the switch actuator, FIG. 5, i.e., at the left of the switch actuator, and three micro switches 102, 104 and 106 are mounted to the rear or right of the switch actuator. Suitable electrical conductors are associated with each of the micro switches and these conductors become a part of the electrical control cable 110.

Sensing of the conduit inner surface intermediate the gauge bar projections 84, and operation of the limit switches in the box 88, is accomplished by the limit switch actuator 108. The actuator 108 is of rectangular transverse cross section having a transverse width greater than that of the gauge bar 66, and is bifurcated at the upper region to define a slot 112. The slot 112 is of slightly greater width than the gauge bar 66 wherein the gauge bar may be received within the slot, and the depth of the slot is such that the parallel extension portions 114 will extend above the gauge bar and terminate at an end surface 116. The end surface 116 is preferably of a convex configuration as to substantially correspond to the configuration of the conduit inner surface. The switch actuator portions 114 and the central portion 118 are closely, slidably received within the switch box guide surfaces 92, and the lower portion of the switch actuator extends into the switch box 88. The lower portion of the switch actuator is formed with a plurality of stepped portions 120 which are tapered in a front-to-rear direction wherein six intersecting edges 122, 124, 126, 128, 130 and 132 are defined with the front and rear edges of the switch actuator. It will be appreciated that because of the tapered configuration of the stepped portions, the vertical relationships of the aforementioned edges will vary with respect to each other.

A cylindrical rod 134 extends from the lowermost step portion 120 and is slidably received within a hole, not shown, defined in the lower wall of the switch box. A spring 136 encompasses the rod and is interposed between the switch actuator 108 and switch box which tends to bias the switch actuator in an upward direction. Engagement of the bottom portion of the slot 112 with the gauge bar 66 will limit upward movement of the switch actuator relative to the gauge bar.

The operation and use of the aforedescribed apparatus will now be explained:

Normally, it is planned to test several hundred feet of buried pipeline with one "pull through" of the measuring apparatus. The section of pipeline to be tested will be substantially straight and not include elbows or T's. The section of the pipeline to be tested is opened to permit insertion of the testing apparatus. To this end, removal of approximately three feet of the pipeline will suffice, or the measuring apparatus could be inserted through an access formed in an elbow or T which was in alignment with the longitudinal axis of the pipeline section to be measured. A pull cord 40 is introduced into the pipeline section to be measured in front of the measuring apparatus, usually several hundred feet in front of the measuring apparatus. The pull cord may be placed into the pipeline by various known means, and provides the motive force for moving the measuring apparatus in a longitudinal direction.

As the primary bending stresses imposed upon buried conduit are due to vertical forces, it is important that the measuring apparatus be oriented to the vertical whereby the gauge bar 66 moves in a substantially vertical direction and, thus, will engage the conduit at the uppermost portion of the conduit inner surface 14. To insure such orientation of the measuring apparatus pull cord, centering means are utilized with the pull cord adjacent the measuring device. In FIG. 1 this centering device takes the form of a sphere 138 of compressible synthetic, but firm, plastic material which is of a diameter substantially corresponding to that of the inner diameter of the conduit. The sphere needs to be compressible that it may pass by an obstruction such as the stem of T 16. The sphere 138 includes a diametrical bore 140 through which the pull cord extends prior to the cord being affixed to the anchor 38. As the bore 140 will be in alignment with the longitudinal axis of the associated conduit 10, it will be appreciated that the portion 142 of the pull cord extends in a downward direction and, thus, produces a downward pull upon the measuring apparatus anchor at all times that the measuring apparatus is being moved. This downward pull upon the anchor 38 will maintain the measuring apparatus in a substantially vertical orientation.

Prior to inserting the measuring apparatus into the pipeline, the electrical cable 110 and the flexible, compressed air supply line 80, are connected to the electrical and pnumatic fittings of the measuring apparatus. These control lines are attached to the control box 144 illustrated in FIG. 1.

A pulling force imposed upon the pull cord 40 will position the measuring apparatus as desired within the pipeline. As the apparatus is pulled through the conduits, the obstruction switch wheel 46 will roll along the upper portion of the condduit inner surface and upon engagement with a T stem 16, will pivot in a clockwise direction to close switch 50 which energizes indicator light 146 upon the control box. Upon the light 146 being energized to indicate that the measuring apparatus is adjacent an obseruction, the operator will take care not to take a bending stress measurement until the measuring apparatus has been pulled past the obstruction.

As the measuring apparatus is being translated through the pipeline, or while it is at rest therein, should the measuring apparatus become inclined relative to the vertical, the mercury switch 62 will close one set of its contacts 64 and indicate such tilting by energizing either light 148 or light 150 upon the control box. These lights indicate in which direction tilting is occurring. In the event of such tilting, the condition can usually be corrected by pulling the measuring apparatus a few feet further along the associated conduit.

Measurements for bending stress within the buried conduits are usually taken at a central region intermediate the conduit ends, in that it is at this region that maximum bending will occur, in most instances. As the opareaor will be aware of the length of the conduits and the position of the joints and flanges 12, the relative position of the measuring apparatus to the ends of the conduit can be easily determined by measurement of the pull cord between translations of the measuring apparatus or markings on the cord.

When it is desired to take a measurement of the bending stress, tension on the pull cord 40 is released to stop the measuring apparatus movement. Assuming the obstruction switch 50 has not been energized and, thus, no obstruction exists between the gauge bar and the inner surface of the conduit, the operator turns control valve 152, FIG. 1, to inject pressurized air through the line 80 into the expansible motors 72. The compressed air will extend the pistons 74 to the positions shown in FIG. 5 and raise the gauge bar 66 toward the upper portion of the conduit inner surface 14. Movement of the gauge bar in an upward direction continues until both the projections 84 engage the conduit inner surface. The normal location of the switch actuator 108 is such that the surface 116 thereof extends above a line interconnecting the uppermost portions of the projections 84 and, thus, upon the projections engaging the conduit inner surface the switch actuator surface 116 will also have engaged the conduit inner surface intermediate the projections. When the switch actuator surface 116 engages the conduit inner surface 14 as the gauge bar is rising, the switch actuator will be held stationary and the switch box and switches will be moving vertically with respect to the switch actuator. Such relative movement between the switch actuator 108 and switches 96–106 is sensed by the switch operating levers 96'–106' as they are actuated by the actuator edges 122–132. The vertical spacing of the actuator edges is such that relative movement between the switch actuator and the gauge bar 66 predetermined units of distance will sequentially operate the switches 96–106. For instance, the apparatus may be constructed such that for each 1/64 of an inch movement between the switch actuator and the gauge bar another switch will be closed.

The switches 96–106 are each connected to one of the indicating lights 154–164 of the control box 144. If no bending of the conduit exists, the apparatus may be preset so that only the indicator light 154 is energized, indicating that only switch 96 has been closed. Such a condition would indicate the tops of the projections 86 and the switch actuator surface 116 were in substantial alignment in a straight line. If the conduit portion engaged by the switch actuator surface 116 is 1/64 of an inch lower than the conduit portions engaged by the projections 84, lights 154 and 156 would both be energized. If the bending of the conduit were such that 1/32 of an inch difference existed between the locations engaged by the projections and the switch actuator, the lights 154, 156 and 158 would all be energized. In a like manner, energizing of the remaining lights 160–164 would indicate additional 1/64 increments of deflection intermediate the projections 84.

By knowing the distance separating the projections 84 and the acceptable limits of bending stress to which the conduits may be subjected, the operator is able to very quickly determine if the conduits of a buried pipeline are being subjected to dangerously high bending stresses by merely observing how many of the indicating lights 154–164 are energized during each testing of the conduit.

At the end of the testing operation, the operator moves the valve 152 to the lowering position which exhausts the pressurized air within the supply line 80 and permits the return springs to retract the pistons 74 and lower the gauge bar 66 to the position of FIG. 1. Thereupon, the measuring apparatus may be translated within the pipeline to the next location to be tested by means of the pull cord 40. Readings may be taken as often as desired and by observing which of the indicating lights 154–164 are energized, the operator is able to quickly evaluate the magnitude of deflection occurring within the pipeline due to bending.

After testing of the desired section of pipeline, the measuring apparatus is removed therefrom and the openings in the pipeline which permitted entry of the measuring apparatus and the pull cord are closed. It would be possible to conduct bending stress analysis in accord with the invention of buried pipeline handling natural gas while the pipeline was under gas pressure. Such an operation would require that sealing be used where the cable 110, line 80 and pull cord 40 enter the pipeline.

It is also within the concept of the invention to provide self-propelled means upon the measuring apparatus and, thus, eliminate the need for the pull cord. Such self-propelled means could take the form of an electric or air motor connected to drive wheels on the frame 20 or other arrangements that may be used that would be within the scope of one skilled in the art. It would also be appreciated that the frame 20 could be mounted upon skids or runners, rather than wheels 34.

Other means than the expansible motors 72 may be used to radially move the gauge bar 66. For instance, mechanical or electric solenoid devices could be used to produce such movement of the gauge bar.

It will be appreciated that the practice of the method of the invention permits buried pipeline to be accurately tested for the presence of bending stresses at relatively low cost, and in the event that excessive bending stresses are indicated, only those sections of pipeline in which such stresses occur need to be replaced to render the pipeline system safe.

The practice of the invention requires the pipeline be unearthed or disturbed only at remotely spaced locations and expensive evacuation procedures are not required. Once the measuring apparatus is placed within the pipeline many measurements can be taken in a relatively short time interval and the invention is able to produce an accurate indication of the presence of bending stresses.

What is claimed is:

1. Apparatus for sensing and measuring bending stress imposed upon a buried conduit having an inner surface and a longitudinal axis comprising, in combination, an elongated frame, conduit inner surface engaging means mounted on said frame adapted to support said frame within the conduit to be measured and permit movement of said frame in the longitudinal direction of said conduit, gauging means movably mounted upon said frame adapted to selectively engage the conduit inner surface, said gauging means comprising a gauge bar longitudinally disposed with respect to the conduit and having at least three conduit inner surface-engaging points defined thereon longitudinally spaced relative to the conduit, one of said points being movable with respect to said bar and at least two of said points in a direction radial with respect to the conduit axis, indicating means connected to said gauging means, actuating means mounted upon said frame and connected to said gauging means adapted to selectively move said gauging means with respect to said frame and the conduit inner surface, and means associated with said frame adapted to move said frame longitudinally within the conduit being measured.

2. Apparatus for sensing and measuring bending stress as in claim 1, electrical switch means connected to said one of said points for actuation thereby, said indicating means being connected to said switch means.

3. In an apparatus for sensing and measuring bending stress as in claim 1, obstruction sensing means mounted upon said frame adapted to sense the existence of obstructions interiorly extending through the conduit inner surface, and indicating means connected to said obstruction sensing means.

4. In an apparatus for sensing and measuring bending stress as in claim 1, gravity-operated switch means mounted upon said frame and indicating means connected to said gravity-operated switch means whereby the orientation of said frame to the horizontal while in the pipeline is sensed and indicated.

5. Apparatus for sensing and measuring bending stress as in claim 1 wherein said means associated with said frame adapted to move said frame longitudinally within said conduit includes a pull cord anchor defined on said frame, said anchor being vertically disposed above the associated conduit's longitudinal axis when said frame is in the desired relationship within the conduit, a pull cord affixed to said anchor, and pull cord centering means affixed to said pull cord at a position forward of said anchor in the direction of frame movement, said centering means including conduit inner surface engaging means whereby said pull cord is substantially aligned with the associated conduit axis at said centering means and said pull cord will exert a downward component of force on said anchor as said frame is translated through said pipeline.

6. The method of measuring longitudinal bending stress within a buried conduit in situ wherein the conduit includes an inner lower surface and an inner upper surface and a longitudinal axis comprising the steps of placing measuring apparatus within said conduit and supporting said apparatus upon the conduit lower surface, engaging the conduit inner upper surface simultaneously at a plurality of longitudinally spaced points located substantially within the plane of forces imposed on the conduit tending to produce bending of the conduit, producing an electric signal indicative of the relationship of said points relative to each other whereby deviation of said points relative to a predetermined relationship is sensed, and transmitting said signal to indicating means remotely located with respect to said measuring apparatus to indicate the degree of measured conduit deflection and stress.

7. The method of measuring, in situ, longitudinal bending stress occurring within a buried pipeline consisting of a plurality of conduits interconnected at their ends and each conduit having an inner surface and a longitudinal axis comprising the steps of placing measuring apparatus within said pipeline, intermittingly translating said apparatus within said pipeline in the longitudinal direction thereof, selectively energizing said measuring apparatus intermediate the translation thereof and when said apparatus is located intermediate the ends of a conduit to sense bending deflection of the conduit in which the measuring apparatus is located and indicating the degree of bending deflection sensed by said measuring apparatus.

8. The method of measuring bending stress as in claim 7 wherein the step of energizing said measuring apparatus includes engaging a conduit inner surface at at least three longitudinally spaced points located substantially within the plane of forces imposed on the engaged conduits tending to produce bending thereof, and the step of indicating the degree of bending deflection of the engaged conduit includes indicating the relationship of said points relative to each other whereby deviation of said points relative to a predetermined relationship is indicated.

9. The method of measuring bending stress as in claim 7 including the steps of sensing and indicating the presence of obstructions within said pipeline as said measuring apparatus is translated within said pipeline.

10. The method of measuring bending stress as in claim 8 wherein said points are vertically disposed above the longitudinal axis of the conduit being engaged by the measuring apparatus and including the step of sensing and indicating the relationship of said measuring apparatus to the horizontal.

References Cited

UNITED STATES PATENTS

| 2,344,216 | 3/1944 | Raydon | 33—174 |
| 2,045,563 | 6/1936 | Benson | 33—174 |
| 2,619,728 | 12/1952 | Ely | 33—174 |
| 2,607,128 | 8/1952 | Newhall | 33—178 |
| 2,074,753 | 3/1937 | McClain | 340—265 |

SAMUEL S. MATTHEWS, Primary Examiner